(12) United States Patent
Min et al.

(10) Patent No.: US 7,558,346 B2
(45) Date of Patent: Jul. 7, 2009

(54) SYMBOL DETECTOR BASED ON FREQUENCY OFFSET COMPENSATION IN ZIGBEE SYSTEM AND SYMBOL DETECTING METHOD THEREOF

(75) Inventors: Sang Hyun Min, Kyungki-Do (KR); Hyung Jin Choi, Seoul (KR); Jung Su Han, Kyungki-Do (KR); Joo Hyun Do, Seoul (KR); Tah Joon Park, Kyungki-Do (KR); Kwang Mook Lee, Seoul (KR); Koon Shik Cho, Seoul (KR); U Sang Lee, Kyungki-Do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 574 days.

(21) Appl. No.: 11/427,771

(22) Filed: Jun. 29, 2006

(65) Prior Publication Data

US 2007/0002937 A1    Jan. 4, 2007

(30) Foreign Application Priority Data

Jun. 30, 2005    (KR) .................. 10-2005-0058478

(51) Int. Cl.
*H04B 1/00* (2006.01)
*H04L 27/06* (2006.01)
(52) U.S. Cl. .................. 375/344; 375/142; 375/150; 375/343

(58) Field of Classification Search .................. 375/140, 375/142, 147, 150, 343, 344
See application file for complete search history.

(56) References Cited

U.S. PATENT DOCUMENTS

2003/0231728 A1* 12/2003 Phang et al. .................. 375/371
2006/0072586 A1* 4/2006 Callaway et al. ....... 370/395.62

FOREIGN PATENT DOCUMENTS

KR    1020020066084    8/2002
KR    1020040080761    9/2004

* cited by examiner

*Primary Examiner*—David B Lugo
(74) *Attorney, Agent, or Firm*—Lowe Hauptman Ham & Berner (57) ABSTRACT

The invention relates to a symbol detector for detecting symbols received in a receive modem of short-range wireless personal area network of a ZigBee system (IEEE 802.15.4). An OQPSK short-range wireless communication system according to the invention acquires frequency offset in a received signal using a symbol contained in a preamble of a packet of the signal, multi-delay-differentiates the signal by a plurality of predetermined delay times, and complex-conjugates the acquired frequency offset to eliminate the frequency offset. Then, the OQPSK short-range wireless communication system according to the invention correlates the received signal with a PN sequence delay-differentiated through the same process to detect the symbols corresponding to the received signal.

7 Claims, 10 Drawing Sheets

SYMBOL DETECTOR BASED ON FREQUENCY OFFSET COMPENSATION IN ZIGBEE SYSTEM AND SYMBOL DETECTING METHOD THEREOF

CLAIM OF PRIORITY

This application claims the benefit of Korean Patent Application No. 2005-58478 filed on Jun. 30, 2005, in the Korean Intellectual Property Office, the disclosure of which is incorporated herein by reference.

BACKGROUND OF THE INVENTION

1. Field of the Invention

The present invention relates to a ZigBee system (IEEE 802.15.4) that is a short-range wireless personal area network, and more particularly, to a symbol detector for detecting a symbol in a receive modem of a 2.4 GHz ZigBee system.

2. Description of the Related Art

Recently, the term "ubiquitous" has been proposed to represent a communication environment in which one can connect to a network at any time, any place. And, there have been active researches on small-scale wireless communication systems, for example, a wireless Personal Area Network (PAN), a sensor network, a Radio Frequency Identification (RFID) rather than on large-scale communication networks such as a cellular network.

Ubiquitous computing is based on the premise of using at any time, any place and absorption into objects and environment in the real world to be integrated into everyday life. In addition, ubiquitous network represents an information communication network in which anyone can use at any time, any place without being restricted by communication speed, and can freely distribute information and contents therethrough. Realization of the ubiquitous network allows the user to be free of various restrictions with existing information communication networks or services and freely use information communication services. There have been efforts to develop new services using ubiquitous computing and network, and thus importance of technologies related thereto has been emphasized. Also, in the future ubiquitous computing environment, it is expected that a wireless sensor network will be composed of more than thousands of node objects with voluntary sensing, low-power communication capabilities to provide various information services at any time, any place.

In an effort to prepare for the ubiquitous environment, there have been active researches and developments on key technologies for realizing ZigBee. Based on these technologies, IEEE 802.15.4 standard defines a physical layer and a link layer as follows.

In general, ZigBee refers to a low-rate IEEE802.15.4 Wireless Personal Area Network (WPAN). It refers to a network in which a frequency band is divided into three bands, and spreading and data rates are set differently for each band for communication, as shown in Table 1 below.

ZigBee aims for small-size, low-power and low-price products. It has drawn attention as a technology for short-range of within 10 to 20 m communication market for wireless networking at home, office, etc. and for recently attention-drawing ubiquitous computing. As shown in Table 1, once an arbitrary physical layer is set for communication in ZigBee, spreading and data rates are determined accordingly for each frequency band, and these settings are applied to both transmission and reception sides for communication.

As ZigBee system aims for ultra-small, low cost, low power as suggested by IEEE802.15.4, a high-cost oscillator cannot be used at a reception end, and therefore, considering that a low-cost oscillator with low precision level is used, it is advised that the system is operable even at an error of ±80 ppm. Therefore, a non-coherent symbol detector is generally used to strengthen the system against frequency offsets.

Figure 1:
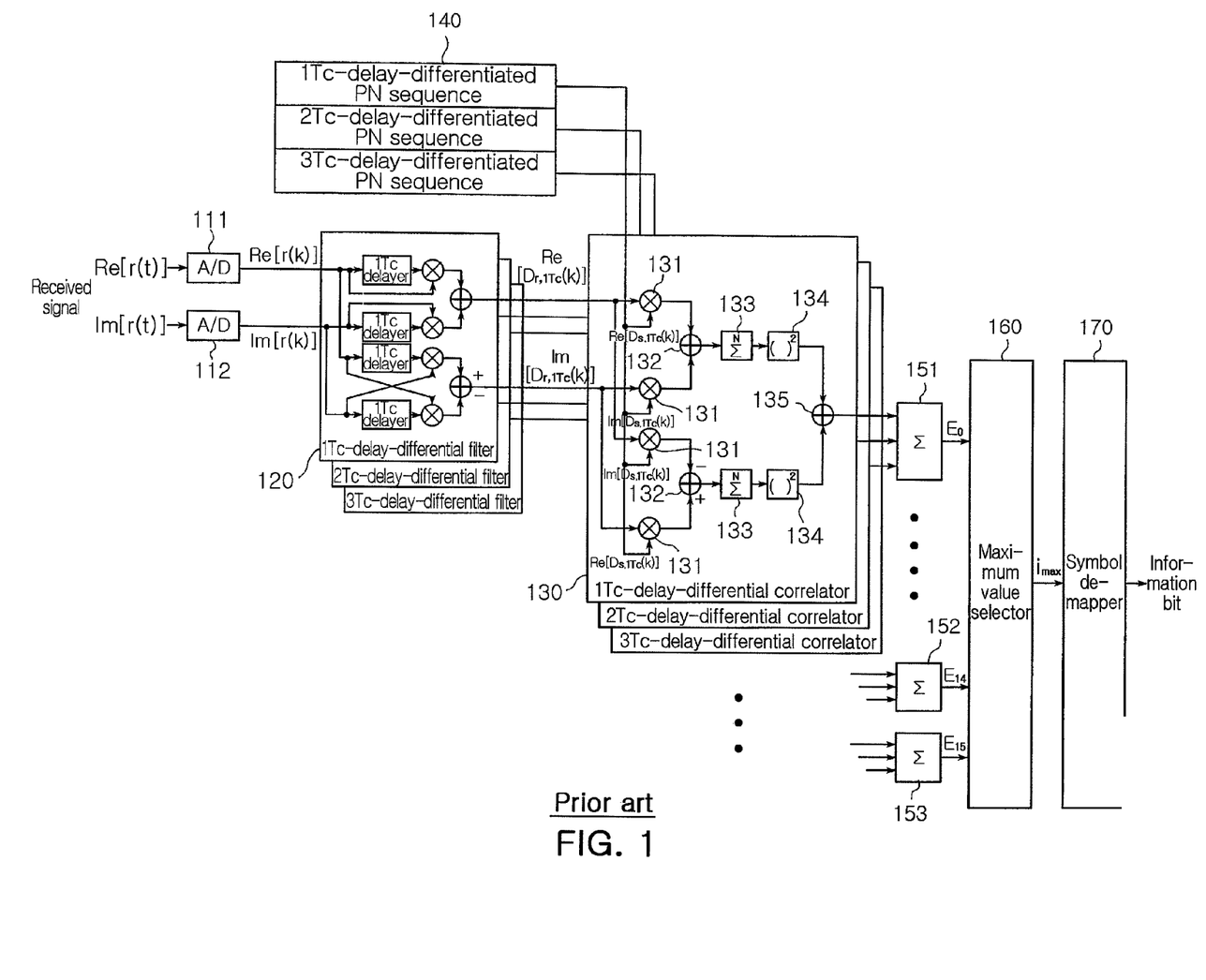
FIG. 1 is a block diagram illustrating a non-coherent symbol detector in a ZigBee system based on 2.4 GHz OQPSK modulation according to the prior art.

FIG. 1 is a block diagram illustrating a non-coherent symbol detector in a ZigBee receive modem based on 2.4 GHz OQPSK modulation according to the prior art.

Referring to FIG. 1, the conventional symbol detector includes a multi-delay-differential filter 120, a plurality of multi-correlators 130, a plurality of adders 151 to 153, a maximum value selector 160 and a symbol demapper 170.

The above conventional symbol detector samples a received signal Re[r(t)] and Im[r(t)] received at a reception end by the predetermined number of sampling by A/D converters 111 and 112 to convert the signal to a digital signal Re[r(k)] and Im[r(k)] and inputs the digital signal to the multi-delay-differential filter 120.

The multi-delay-differential filter 120 delays the received signal by a plurality of predetermined delay times 1Tc, 2Tc and 3Tc, conjugates each of the delayed received signals, and multiplies each of the delayed signals by the received signal to output multi-delay-differentiated signals $D_{r,1Tc}(k)$, $D_{r,2Tc}(k)$ and $D_{r,3Tc}(k)$.

The outputs from the multi-delay-differential filter 120 are inputted into a multi-correlator 130. FIG. 1 illustrates only the multi-correlator 130 and the multi-delay-differentiated PN sequence 140 corresponding to symbol #0 out of symbols #0 to #15. But the symbol detector includes the multi-correlators and the multi-delay-differentiated PN sequences corresponding, respectively, to the rest of the symbols #1 to #15. That is, the symbol detector includes a plurality of multi-correlators 130 and multi-delay-differentiated PN sequences 140 provided in the number corresponding to that of symbols (0 to 15). A multi-delay-differentiated PN sequence 140 refers to a PN sequence that is multi-delay-differentiated through the same process as conducted by the multi-delay-differential filter 120.

The multi-correlator 130 complex-conjugates each of the multi-delay-differentiated signals $D_{r,1Tc}(k)$ $D_{r,2Tc}(k)$ and $D_{r,3Tc}(k)$ outputted from the multi-delay-differential filter 120 with the multi-delay-differentiated PN sequences

TABLE 1

| Physical | | Spreading Parameter | | Data Parameter | | |
|---|---|---|---|---|---|---|
| | | | | Bit | | |
| layer (MHz) | Frequency Band (MHz) | Chip Rate (Kchips/s) | Modulation | Rate (Kb/s) | Symbol Rate (Ksymbol/s) | Symbol |
| 868/915 | 868-868.6 | 300 | BPSK | 20 | 20 | Binary |
| | 902-928 | 600 | BPSK | 40 | 40 | Binary |
| 2450 | 2400-2483.5 | 2000 | O-QPSK | 250 | 62.5 | 16-ary Orthogonal |

$D_{s,1TC}(k)$, $D_{s,2Tc}(k)$ and $D_{s,3Tc}(k)$ corresponding to the particular symbol, using a plurality of multipliers 131 and adders 132. Then, the multi-correlator 130 integrates for one symbol period with an integrator 133. For the value integrated for one symbol period, a real part and an imaginary part thereof are respectively squared by a square calculator 134 to eliminate frequency offsets.

Each of the plurality of summers 151 to 153 sums the output values of 1Tc, 2Tc and 3Tc delay-differentiated signal correlators of the multi-correlator 130 provided for each symbol, thereby obtaining the magnitude of the energy of the received signal.

A maximum value selector 160 receives all the output values from the multi-correlator 130, and selects the greatest value as the output value $i_{max}$ of the detected symbol. The symbol value selected as just described is demapped into bit data by a symbol demapper 170 to obtain desired information bit.

However, this conventional non-coherent symbol detector includes a squaring process by the square calculator 130 in the multi-correlator 130, degrading its capabilities due to resultant square loss, and also is hardly realized as hardware.

SUMMARY OF THE INVENTION

The present invention has been made to solve the foregoing problems of the prior art and therefore an object of certain embodiments of the present invention is to provide a symbol detector which is improved in capabilities and easily realized as hardware to detect symbols received in a receive modem in an OQPSK short-range wireless communication system.

According to an aspect of the invention for realizing the object, there is provided a symbol detector for detecting symbols of a signal received in an Offset Quaternary Phase Shift Keying (OQPSK) short-range wireless communication system, including: a frequency offset estimator for acquiring frequency offset in the received signal using a particular symbol contained in a preamble of a packet of the signal; a multi-delay-differential filter for multi-delay-differentiating the signal by a plurality of predetermined delay times; a multi-frequency offset compensator for complex-conjugating the multi-delay-differentiated signal by the multi-delay differential filter and the frequency offset acquired by the frequency offset estimator to eliminate the frequency offset; a plurality of multi-correlators for correlating an output value from the multi-frequency offset compensator and a PN sequence delay-differentiated through the same process as conducted by the multi-delay-differential filter, where the PN sequence corresponds one-to-one to the particular symbol; a plurality of summers for summing individual output values from the multi-correlators; and a maximum value selector for selecting a maximum value out of the summed values of the plurality of summers.

According to another aspect of the invention for realizing the object, there is provided a method for detecting symbols from a signal received in a receive modem of an OQPSK short-range wireless communication system, including steps of:

(i) acquiring frequency offset present in the signal using a particular symbol contained in a preamble of a packet of the signal;

(ii) multi-delay-differentiating the signal by a plurality of predetermined delay times;

(iii) complex-conjugating the multi-delay-differentiated received signal in the step (ii) with the frequency offset acquired in the step (i) to eliminate the frequency offset;

(iv) correlating an output value with the frequency eliminated in the step (iii) and a PN sequence multi-delay-differentiated through the same process as conducted by a multi-delay-differential filter, where the PN sequence corresponds to the particular symbol;

(v) summing individual output values correlated by multi-correlators; and (vi) selecting a maximum value out of the summed output values of the multi-correlators.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings. The same reference numerals are used throughout the different drawings to designate the same or similar components. In the following description, well-known functions and constructions are not described in detail since they would obscure the intention in unnecessary detail.

Figure 2:
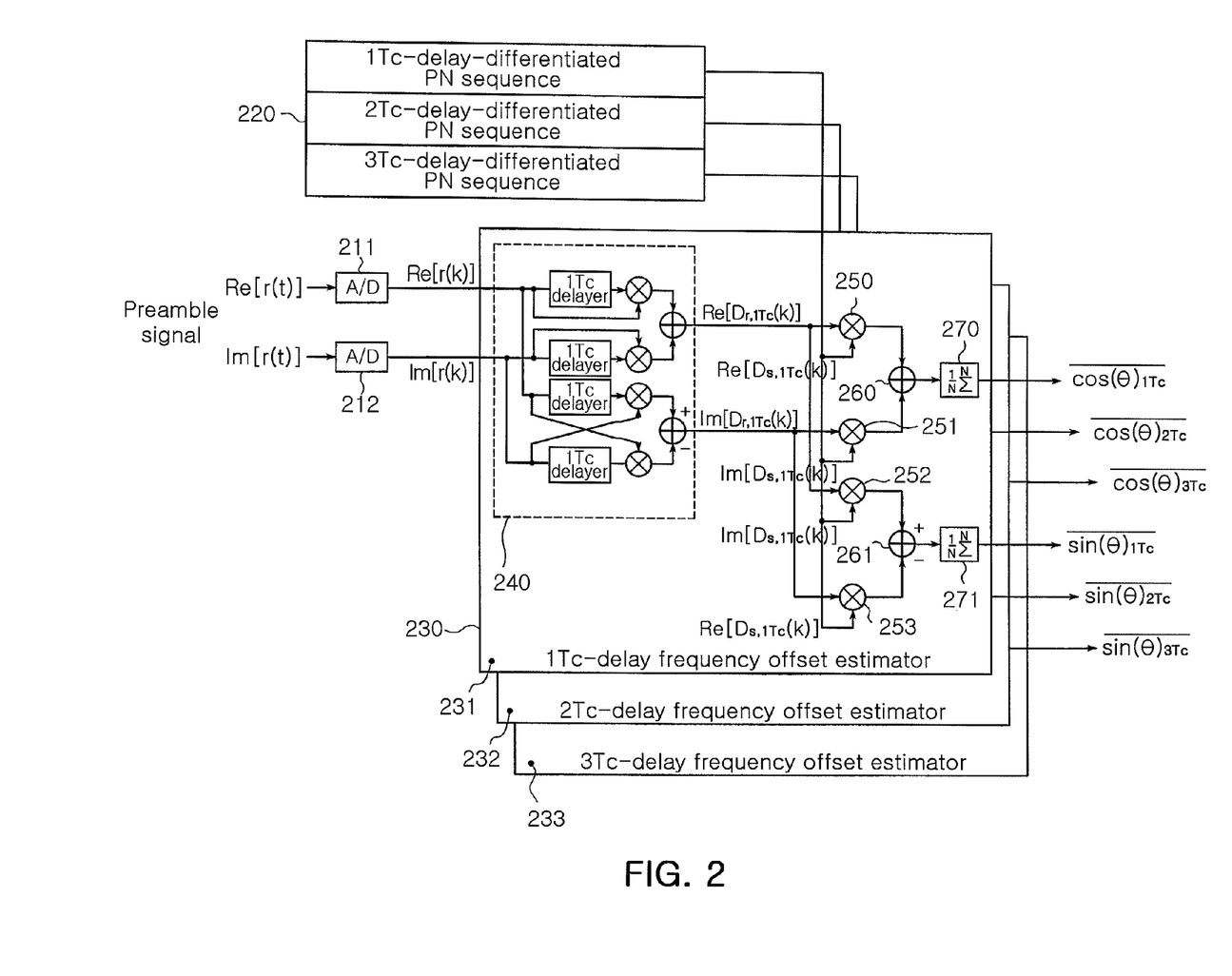
FIG. 2 is a block diagram illustrating a frequency offset estimator in a ZigBee system according to a certain embodiment of the present invention.

FIG. 2 is a block diagram illustrating a frequency offset estimator 230 in a ZigBee system according to a certain embodiment of the present invention.

Referring to FIG. 2, the frequency offset estimator 230 according to a certain embodiment of the present invention includes a multi-delay-differential filter 240, a plurality of multipliers 250 to 253, a plurality of adders 260 and 261 and mean calculators 270 and 271. FIG. 2 illustrates detailed configuration of a 1Tc-delay frequency offset estimator 231 included in the frequency offset estimator 230 according to the present invention. 2Tc and 3Tc-delay frequency offset estimators overlapped underneath have the same configuration as that of the 1Tc-delay frequency offset estimator 231, except that the delay time is varied to 2Tc or 3Tc. Hereinafter, for the sake of convenience, the process of frequency offset estimation will be explained with focus on the computation process of 1Tc delay with respect to the frequency offset estimator 231 and other multi-devices. Thus, unless explained otherwise, it is understood that the same multi-computation process is applied to each of 1Tc, 2Tc and 3Tc delays.

In the present invention, a particular symbol contained in a preamble of a packet of a received signal is used to acquire frequency offsets in the signal at a reception end of the ZigBee system. The first eight symbols of the packet of the signal received at the reception end constitute the preamble commonly recognizable by both the transmission and reception ends. In the present invention, one particular symbol out of the eight symbols is used to calculate frequency offsets as follows.

First, a signal Re[r(t)] and Im[r(t)] received at the reception end of the ZigBee system is sampled by A/D converters 211 and 212 by the predetermined number of sampling and converted to a digital signal Re[r(k)] and Im[r(k)], and then inputted to the frequency offset estimator 230.

Thereafter, the multi-delay-differential filter 240 in the frequency offset estimator 230 delays the received signal by a plurality of delay times 1Tc, 2Tc and 3Tc, and conjugates and then multiplies each of the delayed signals by the received signal to output multi-delay-differentiated signals $D_{r,1Tc}(k)$, $D_{r,2Tc}(k)$ and $D_{r,3Tc}(k)$.

A plurality of multipliers 250 to 253 and adders 260 and 261 complex-conjugate the particular symbol (e.g. symbol #0) contained in the preamble of the packet of the multi-delay-differentiated signals $D_{r,1Tc}(k)$, $D_{r,2Tc}(k)$ and $D_{r,3Tc}(k)$ with a value 220 that was obtained by delay-differentiating a PN sequence corresponding to the particular symbol in the same fashion as conducted by the multi-delay-differential filter 240. Here, the multi-delayed PN sequence 200 is obtained by delay-differentiating the PN sequence corresponding to the particular symbol (e.g. symbol #0) in the same fashion as the multi-delay-differential filter 240 executes delay and differentiation.

Thereafter, each of the mean calculators 270 and 271 calculates a mean for output values of the plurality of adders 260 and 261 in terms of the number of sample in the sampling of one symbol, thereby obtaining frequency offsets $\overline{\cos(\theta)_{1Tc}}$, $\overline{\cos(\theta)_{2Tc}}$, $\overline{\cos(\theta)_{3Tc}}$, $\overline{\sin(\theta)_{1Tc}}$, $\overline{\sin(\theta)_{2Tc}}$, and $\overline{\sin(\theta)_{3Tc}}$ for the particular symbol (e.g. symbol #0) contained in the preamble of the packet of the reception signal according to the present invention.

Figure 2A:
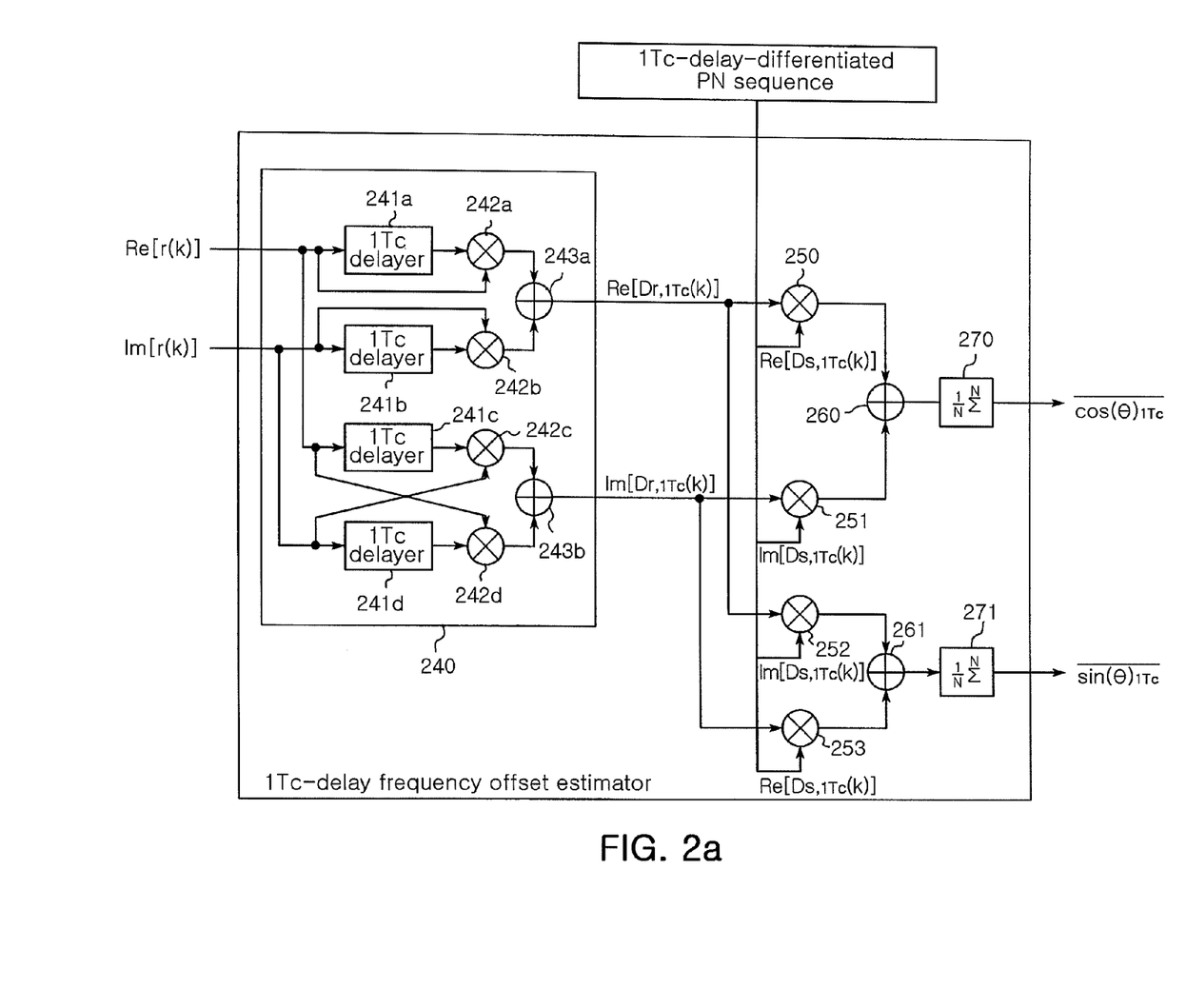
FIGS. 2a to 2c are detailed diagrams illustrating the frequency offset estimator according to a certain embodiment of the present invention.
Figure 2B:
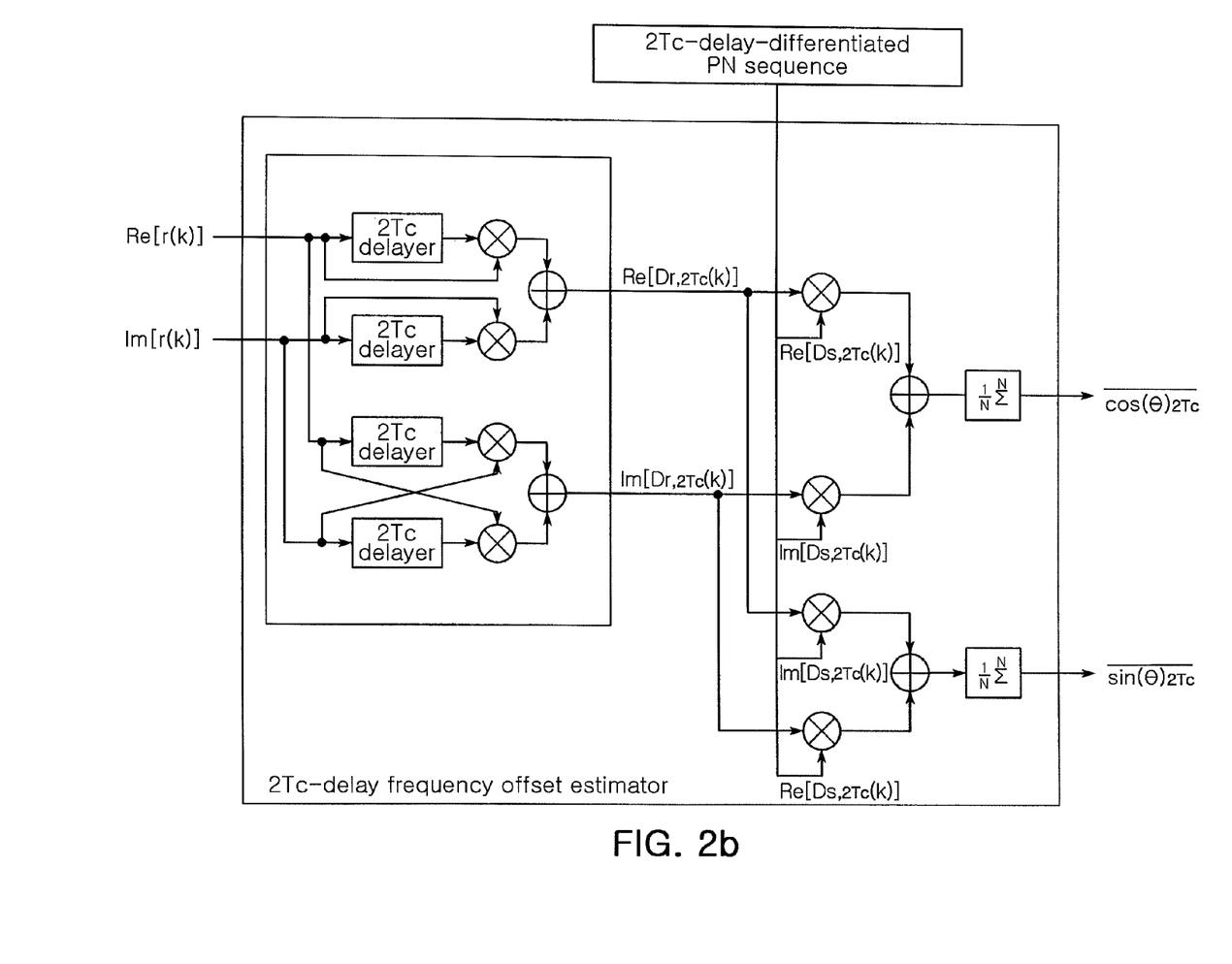
Figure 2C:
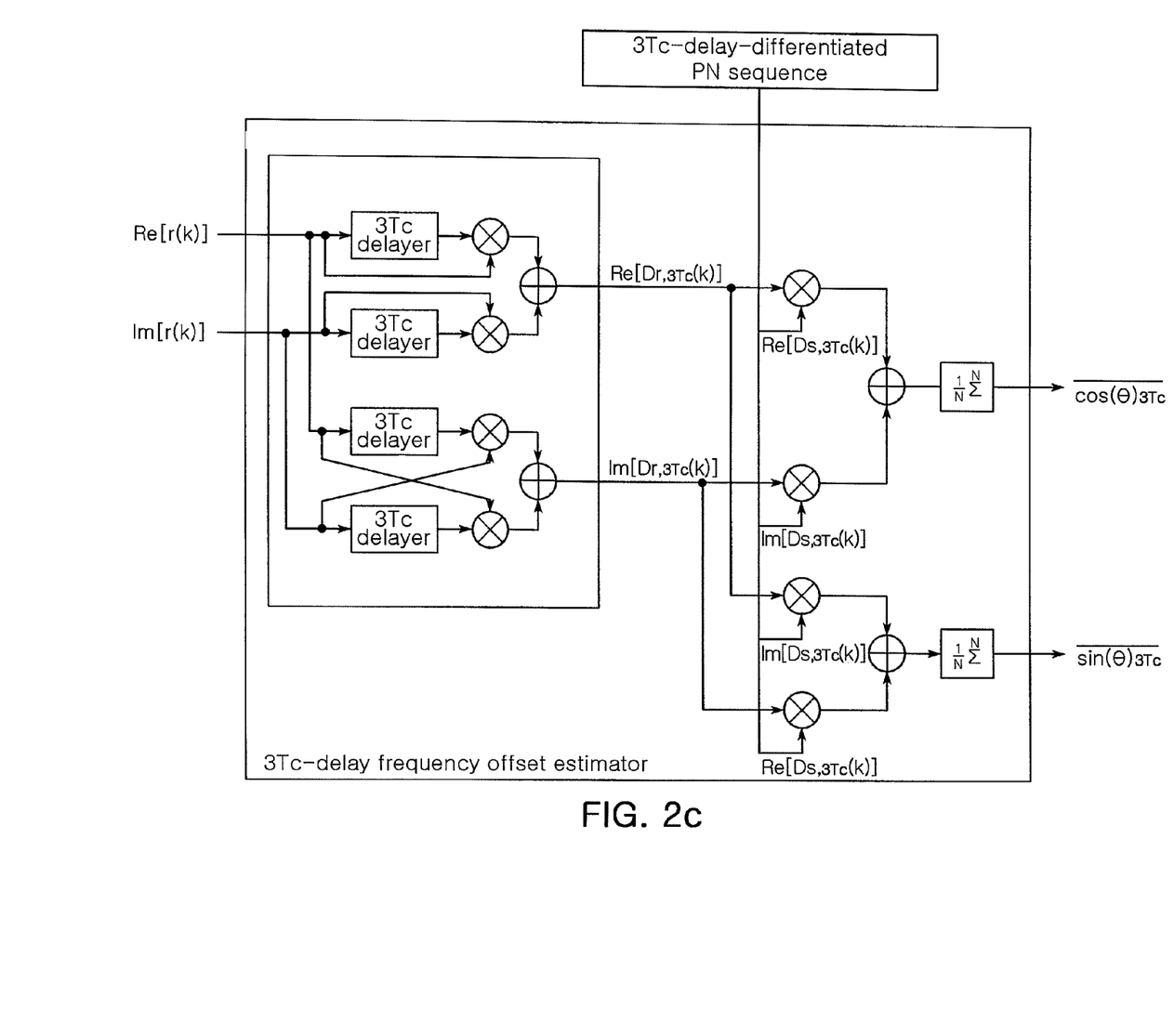

FIGS. 2a to 2c are detailed configurations of the frequency offset estimator 230 according to this embodiment of the present invention. A detailed operation of the multi-delay-differential filter 240 and a process of calculating frequency offset for 1Tc, 2Tc and 3Tc delayed signals will now be explained with reference to FIGS. 2a to 2c.

As shown in FIG. 2a, the multi-delay differential filter 240 of the 1Tc-delay frequency offset estimator 231 delays the received signal by a predetermined delay time of 1Tc, conjugates and then multiplies the delayed signals by the received signal to output a 1Tc-delay differentiated signal $D_{r,1Tc}(k)$.

The operation of the multi-delay-differential filter 240 of the 1Tc-delay frequency offset estimator 231 is explained in detail as follows. The multi-delay-differential filter 240 delays a real value Re[r(k)] and an imaginary value Im[r(k)] by 1Tc using a plurality of 1Tc delayers 241a to 241d. And a first multiplier 242a multiplies the real value of the received signal by a real value of the 1Tc-delayed received signal. A second multiplier 242b multiplies the imaginary value of the received signal by an imaginary value of the 1Tc-delayed received signal. A third multiplier 242c multiplies a 1Tc-delayed signal of the real value of the received signal by the imaginary value of the received signal. A fourth multiplier 242d multiplies the real value of the received signal by the imaginary value of 1Tc-delayed received signal. A first adder 243a adds output values of the first multiplier 242a and the second multiplier 242b to output a real value $Re[D_{r,1Tc}(k)]$ of 1Tc-delay-differentiated received signal. A second adder 243b subtracts an output value of the fourth multiplier 242d from an output value of the third multiplier 242c to output an imaginary value $Im[D_{r,1Tc}(k)]$ of 1Tc-delay-differentiated received signal.

The particular symbol (e.g. symbol #0) contained in the preamble of the packet of the 1Tc-delay-differentiated signal $D_{r,1Tc}(k)$ is complex-conjugated with a 1Tc-delay-differentiated PN sequence obtained by delay-differentiating a PN sequence corresponding to the particular symbol in the same fashion as conducted by the multi-delay-differential filter 240 of the 1Tc-delay frequency offset estimator 231. Then, a mean for one symbol period is acquired to obtain frequency offsets $\overline{\cos(\theta)_{1Tc}}$ and $\overline{\sin(\theta)_{1Tc}}$ for the 1Tc-delay differentiated signal $D_{r,1Tc}(k)$.

Referring to FIG. 2b, the multi-delay-differential filter 240 of a 2Tc-delay frequency offset estimator 232 delays the received signal by a predetermined delay time of 2Tc, conjugates and then multiplies the delayed signal by the received signal to output the 2Tc-delay-differentiated signal $D_{r,2Tc}(k)$. Then, the particular symbol (e.g. symbol #0) contained in the preamble of the packet of the 2Tc-delay-differentiated signal $D_{r,2Tc}(k)$ is complex-conjugated with a 2Tc-delay-differentiated PN sequence obtained by delay-differentiating the PN sequence corresponding to the particular symbol in the same fashion as conducted by the multi-delay-differential filter 240 of the 2Tc-delay frequency offset estimator 232, and a mean for one symbol period is acquired to obtain frequency offsets $\overline{\cos(\theta)_{2Tc}}$ and $\overline{\sin(\theta)_{2Tc}}$ for the 2Tc-delay-differentiated signal $D_{r,2Tc}(k)$.

In the same fashion as described above, frequency offsets $\overline{\cos(\theta)_{3Tc}}$ and $\overline{\sin(\theta)_{3Tc}}$ can be obtained for the 3Tc-delay-differentiated signal $D_{r,3Tc}(k)$ using a 3Tc-delay frequency offset estimator 233, as shown in FIG. 2c.

Figure 3:
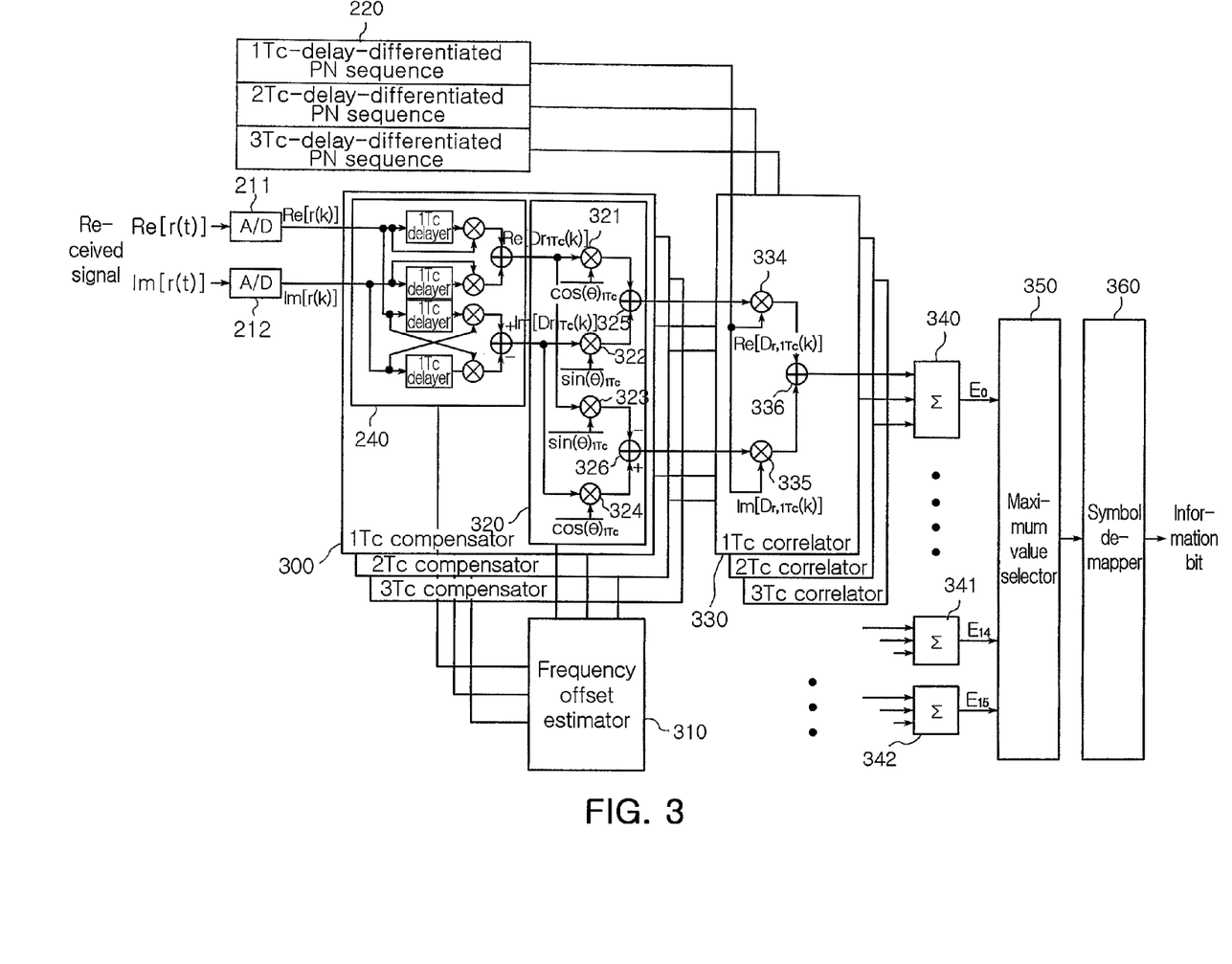
FIG. 3 is a block diagram illustrating a non-coherent symbol detector in a ZigBee receive modem based on 2.4 GHz OQPSK modulation according to a certain embodiment of the present invention.
Figure 3A:
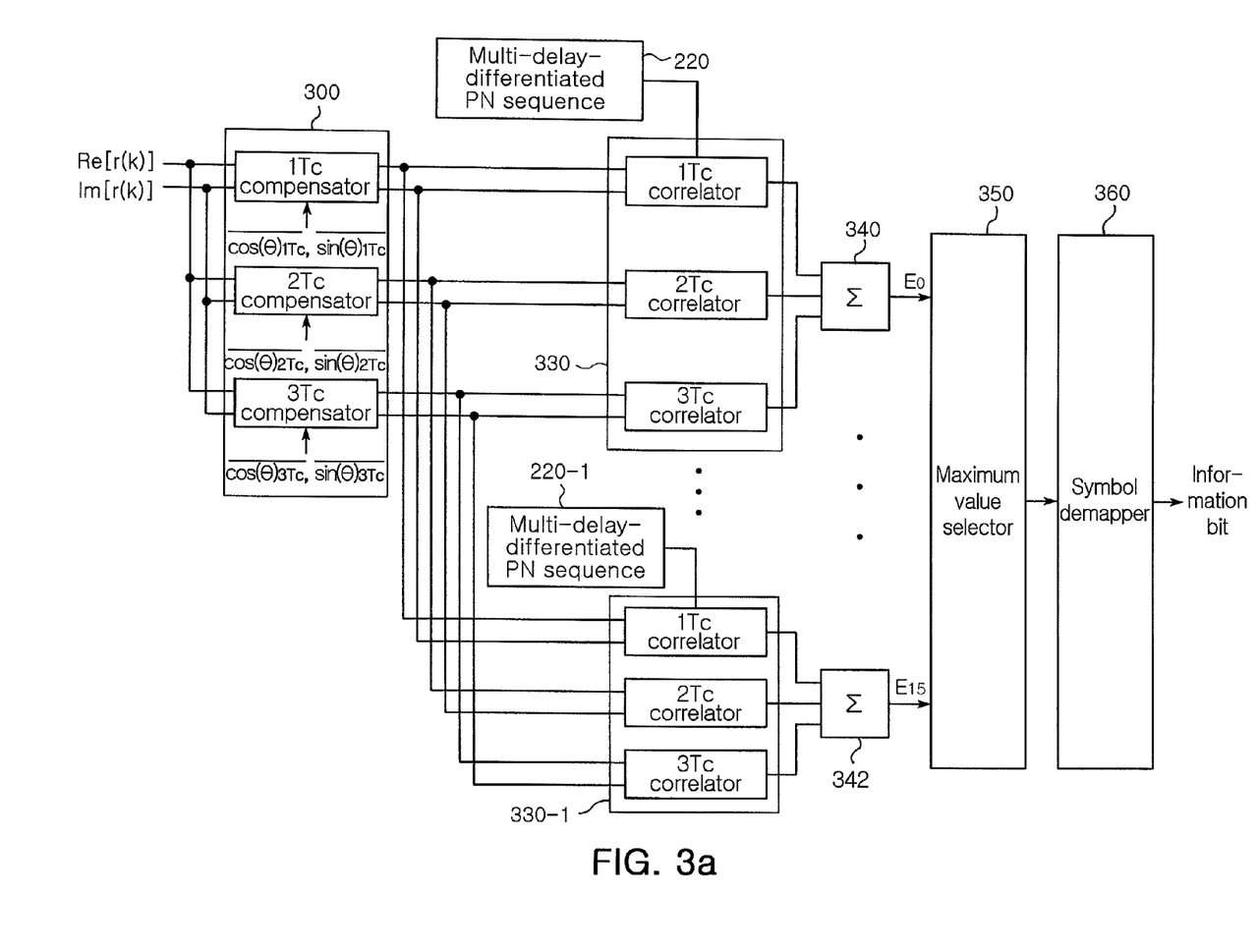
FIG. 3a is a detailed diagram illustrating the non-coherent symbol detector in a ZigBee receive modem based on 2.4 GHz OQPSK modulation according to a certain embodiment of the present invention.

FIG. 3 is a block diagram illustrating a non-coherent symbol detector in a ZigBee receive modem based on 2.4 GHz OQPSK modulation. FIG. 3a illustrates in detail the non-coherent symbol detector in ZigBee receive modem based on 2.4 GHz OQPSK modulation according to a certain embodiment of the present invention.

Referring to FIGS. 3 and 3a, the non-coherent symbol detector in the ZigBee receive modem according to the present invention includes a frequency offset estimator 310, a plurality of multi-compensators 300 each consisted of the multi-delay-differential filter 240 and of a multi-frequency compensator 320, a plurality of multi-correlators 330, a plurality of summers 340 and a maximum value selector 350, and detects symbols as follows.

First, a signal Re[r(t)] and Im[r(t)] received at a reception end of ZigBee system is sampled by the predetermined number of sampling by A/D converters 211 and 212, converted to a digital signal Re[r(k)] and Im[r(k)], and then inputted into the multi-compensator 300. Here, as shown in FIG. 3a, the received signal is inputted respectively into a 1Tc compensator, a 2Tc compensator and a 3Tc compensator constituting the multi-compensator 300.

Then, as shown in FIG. 3, the multi-delay-differential filter 240 inside the multi-compensator 300 delays the received signal by a plurality of predetermined delay times 1Tc, 2Tc and 3Tc, conjugates and then multiplies each of the delayed signals by the received signal to output the multi-delay-differentiated signals $D_{r,1Tc}(k)$, $D_{r,2Tc}(k)$ and $D_{r,3Tc}(k)$.

The multi-delay-differentiated signals from the multi-delay-differential filter 240 are inputted into the multi-frequency compensator 320.

The multi-frequency compensator 320 complex-conjugates the multi-delay-differentiated signals $D_{r,1Tc}(k)$, $D_{r,2Tc}(k)$ and $D_{r,3Tc}(k)$ outputted from the multi-delay-differential filter 240 with the frequency offsets $\overline{\cos(\theta)_{1Tc}}$, $\overline{\cos(\theta)_{2Tc}}$, $\overline{\cos(\theta)_{3Tc}}$, $\overline{\sin(\theta)_{1Tc}}$, $\overline{\sin(\theta)_{2Tc}}$, and $\overline{\sin(\theta)_{3Tc}}$ estimated by the frequency offset estimator 310, thereby compensating for the frequency offsets for the received signal. Here, as shown in FIG. 3a, the 1Tc compensator, the 2Tc compensator and the 3Tc compensator inside the multi-frequency compensator 320 receive the frequency offsets $\overline{\cos(\theta)_{1Tc}}$, and $\overline{\sin(\theta)_{1Tc}}$ for the 1Tc-delay-differentiated signal $D_{r,1Tc}(k)$, the frequency offsets $\overline{\cos(\theta)_{2Tc}}$, and $\overline{\sin(\theta)_{2Tc}}$ for the 2Tc-delay-differentiated signal $D_{r,2Tc}(k)$, and the frequency offsets $\overline{\cos(\theta)_{3Tc}}$, and $\overline{\sin(\theta)_{3Tc}}$, for the 3Tc-delay-differentiated signal $D_{r,3Tc}(k)$ from the frequency offset estimator 310, respectively.

Output values of the multi-frequency compensator 320 are inputted into a plurality of multi-correlators 330 and 330-1 corresponding, respectively, one-to-one with symbols (symbols #0 to #15) of the received signal. The plurality of multi-correlators 330 and 330-1 are assigned respectively to each symbol (symbol #0 to #15) and thus there are 16 multi-correlators in total. Here, as shown in FIG. 3a, the output values of the 1Tc compensator, the 2Tc compensator and the 3Tc compensator are received respectively by a 1Tc correlator, a 2Tc correlator and a 3Tc correlator constituting each of the plurality of multi-correlators 330 and 330-1.

Each of the plurality of multi-correlators 330 and 330-1 is assigned to each of the symbols (symbol #0 to #15), and correlates the output values of the multi-frequency compensator 320 with each of the PN sequences 220 and 220-1 delay-differentiated in the same fashion as conducted by the multi-delay-differential filter 240. For example, the output values of the multi-frequency compensator 320 are inputted into the multi-correlator 330 assigned to symbol #0, and then correlated with the PN sequence, corresponding to symbol #0, delay-differentiated in the same fashion as conducted by the multi-delay-differential filter 240.

The rest of the multi-correlators, for example, the multi-correlator 330-1 corresponding to symbol #15 receive the output values of the multi-frequency compensator 320, and then correlate the values with a PN sequence 220-1, corresponding to symbol #15, delay-differentiated in the same fashion as conducted by the multi-delay-differential filter.

Each of the summers 340, 341 and 342 sums individual output values of the multi-correlators 330 and 330-1 to acquire the magnitude of energy of the received signal.

The maximum value selector 350 receives all of the output values of the plurality of summers 340, 341 and 342, and selects a maximum value as the output value $i_{max}$ for the detected symbol.

The symbol value selected as just described is demapped by a symbol demapper 360 to obtain desired information bit.

In the above described embodiment, the interval of the multi-delay times is 1Tc(1 chip or ½ chip period) and thus the delay times are set 1Tc, 2Tc and 3Tc, but these delay times do not limit the present invention, and can be modified to improve capabilities of the symbol detector. With a shorter interval, more accurate results can be obtained.

A process of detecting symbols based on frequency offset compensation according to the present invention is as follows.

First, given that a pulse-shaped transmission signal is s(k), a signal r(k) received at a reception end can be represented as Equation 1 below.

$$r(k)=s(k)e^{j2\pi\Delta fk} \quad \text{Equation 1}$$

Here, k is a time index, $\Delta f$ is frequency offset of a carrier. Thus, $e^{j2\pi\Delta fk}$ in above Equation 1 represents channel distortion.

Therefore, the signal received at the reception end converts frequency offset to smaller frequency offset via the multi-delay-differential filter 240 as expressed in Equation 2 below.

$$\begin{aligned} D_r(k) &= r(k)r^*(k-NTc) \\ &= s(k)e^{j2\pi\Delta fk}s^*(k-NTc)e^{-j2\pi\Delta fk(k-NTc)} \\ &= s(k)s^*(k-NTc)e^{j2\pi\Delta fNTc} \end{aligned} \quad \text{Equation 2}$$

Here, Tc is ½ chip time which is OQPSK symbol time, and N is a factor for delayed input, having a constant value.

A signal $D_r(k)$ which is complex-conjugated with the output values of the multi-frequency offset compensator 320 by the multi-correlator 330 is a differentiated PN sequence complex-conjugated from a transmission signal, and can be expressed as $D_s(k)=s(k)s^*(k-NTc)$.

Therefore, a signal C(k) complex-conjugated with the differentiated PN sequence $D_s(k)$ can be expressed as in Equation 3 below.

$$\begin{aligned} C(k) &= D(k)[D_s(k)]^* \\ &= [s(k)s^*(k-NTc)e^{j2\pi\Delta fNTc}][s(k)s(k-NTc)] \\ &= e^{j2\pi\Delta fNTc} \end{aligned} \quad \text{Equation 3}$$

Therefore, the signal obtained by complex-conjugating the received signal with frequency offsets taken into account and the differentiated PN sequence can be expressed as in Equation 4 below.

$$C(k)=\cos(j2\pi\Delta fNTc)+j\sin(j2\pi\Delta fNTc) \quad \text{Equation 4}$$

In addition, according to the present invention, frequency offsets are estimated as follows.

First, a received preamble signal is calculated by Equations 1 to 4 due to its frequency offsets.

Supposing that the signal obtained by complex-conjugating the received preamble signal with the differentiated PN sequence is $C_{pre}(k)$, estimated frequency offset $f_{est}(k)$ is a signal that is obtained by acquiring a cumulative mean of the sample of one symbol of the preamble and can be expressed as in Equation 5 below.

$$\begin{aligned} f_{est}(k) &= \frac{1}{M}\sum C_{pre}(k) \\ &= \overline{\cos(j2\pi\Delta fNTc)} + \overline{j\sin(j2\pi\Delta fNTc)} \end{aligned} \quad \text{Equation 5}$$

Here, M is the number of samples for one symbol out of symbols contained in the preamble. Examining above Equation 5, frequency offsets can be obtained from the complex-conjugated signal $C_{pre}(k)$ by summing k=0 to (M−1), i.e., the entire sample and dividing the sum by the number of sample to acquire a mean.

The frequency offsets obtained as described above can be used to compensate for the frequency offsets in a received signal as follows.

That is, a received data signal goes through the same process from Equation 1 to Equation 4 due to its frequency offsets. Supposing that the data signal received at the reception end and multi-delay-differentiated by the multi-delay-differential filter 240 is $C_{data}(k)$, this signal can be complex-conjugated with frequency offset $f_{est}(k)$ estimated from the preamble to ultimately compensate for the frequency offsets. Supposing that a data signal with its frequency offsets compensated is $\hat{C}_{data}$, this signal can be expressed as in Equation 6 below.

$$\hat{C}_{data} = C_{data}(k) \cdot f'_{est}(k)$$
$$= C_{data}(k) \cdot [\overline{\cos(j2\pi\Delta fNTc)} + \overline{j\sin(j2\pi\Delta fNTc)}]$$
$$= 1$$

Equation 6

As shown in above Equation 6, frequency offsets can be estimated from the preamble to compensate for the effect of frequency offsets in a data signal.

FIGS. 4a to 4e are graphs comparing bit error rates (BERs) of the conventional non-coherent symbol detector with those of the symbol detector according to the present invention.

In FIGS. 4a to 4e, the symbol ■ denotes the bit error rate of the conventional non-coherent symbol detector, and the symbol ○ denotes the bit error rate of the symbol detector with frequency offsets compensated according to the present invention.

Figure 4A:
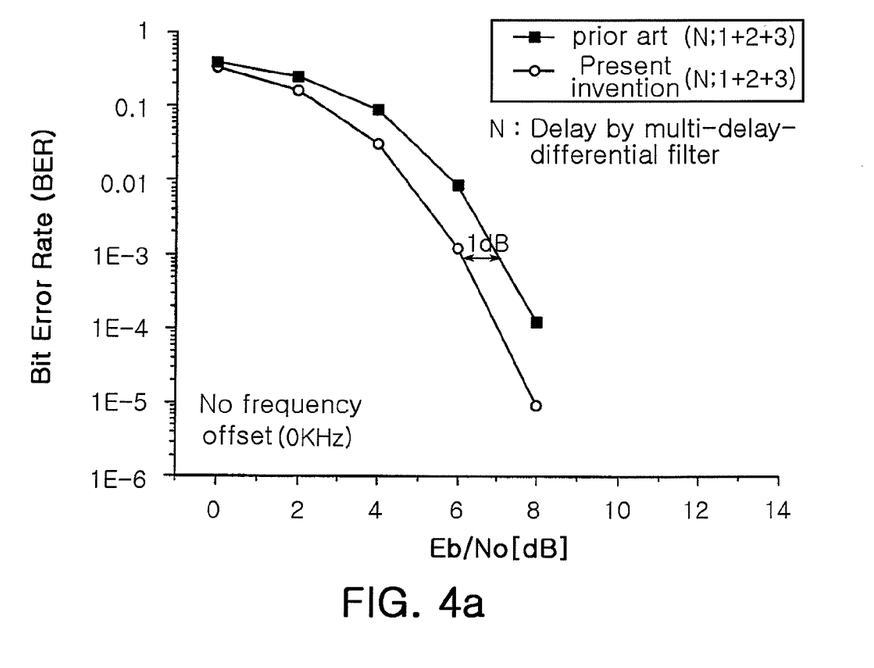
FIGS. 4a to 4e are graphs comparing bit error rates (BERs) of the conventional non-coherent symbol detector with those of the symbol detector according to the present invention.
Figure 4B:
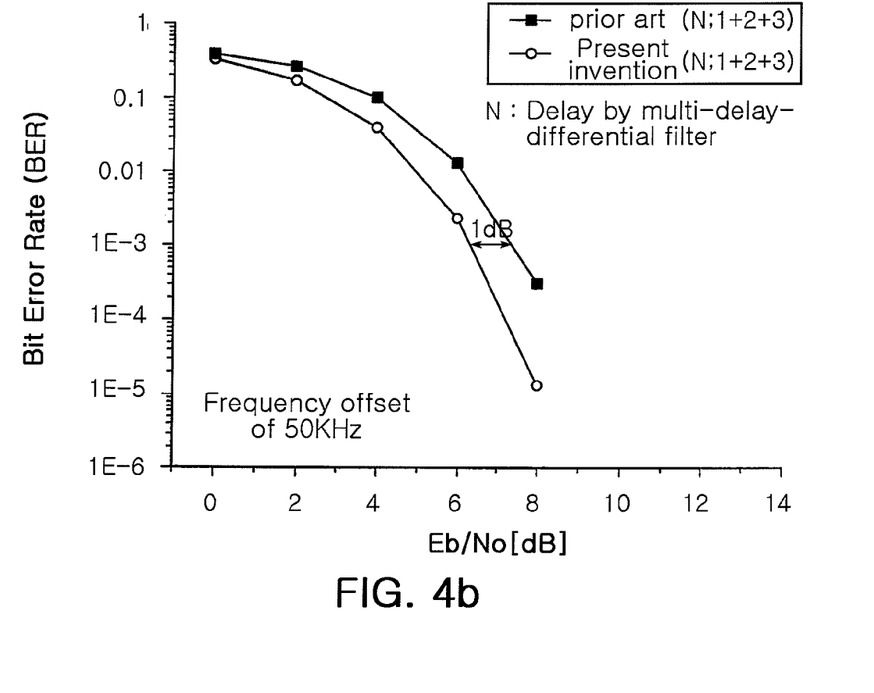
Figure 4C:
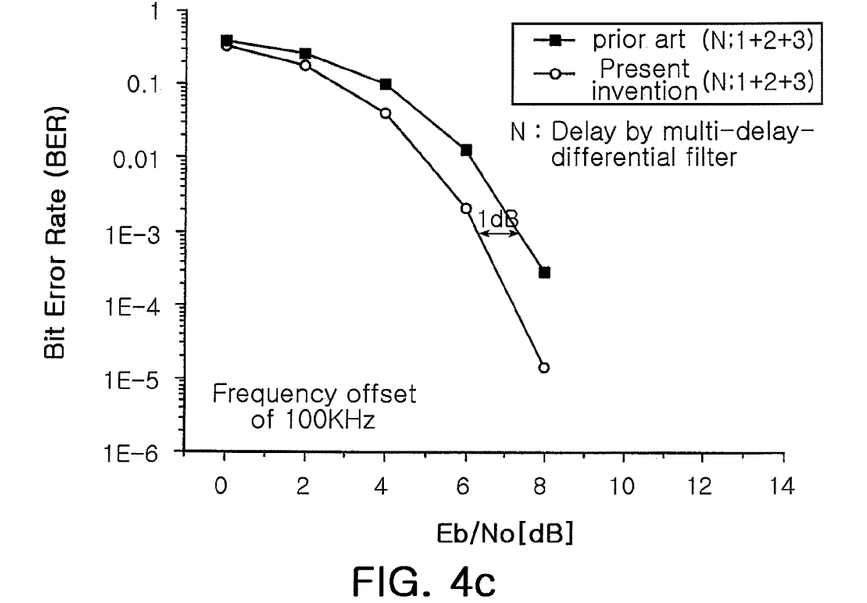
Figure 4D:
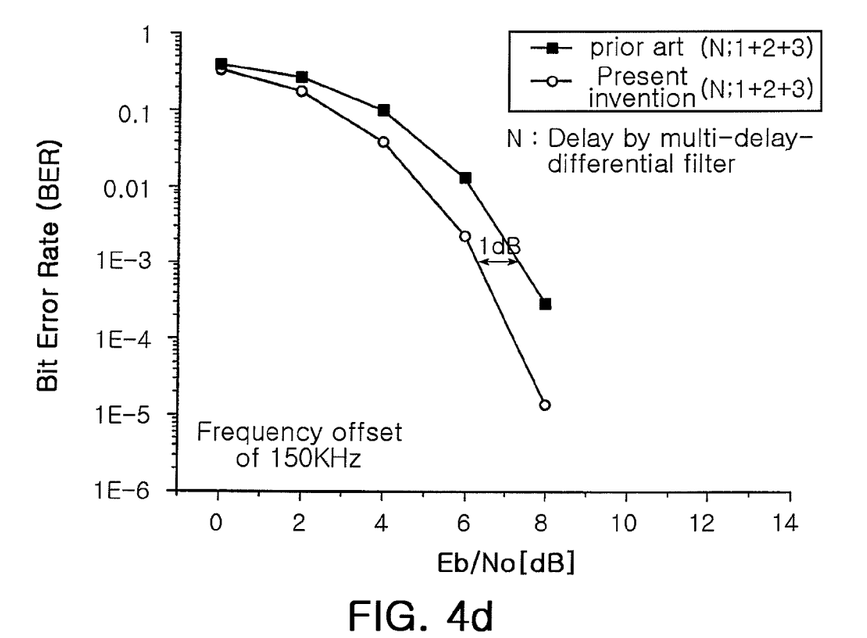
Figure 4E:
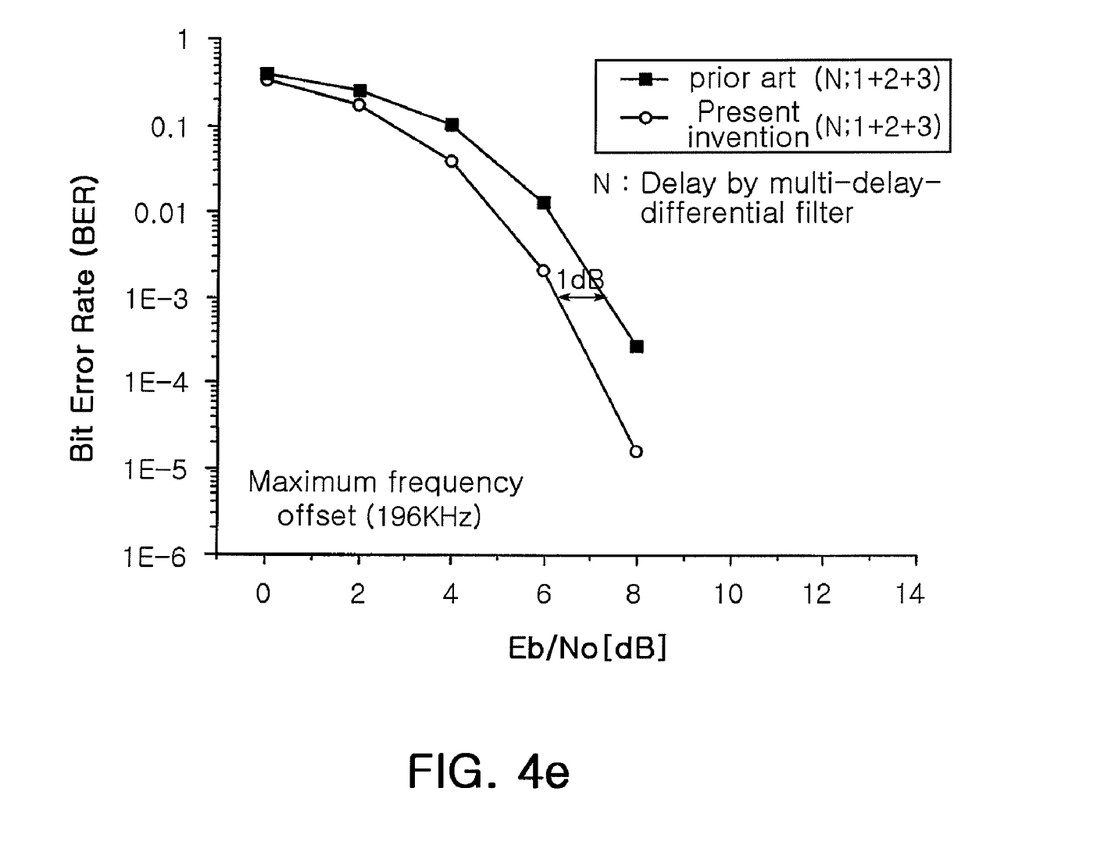

First, FIG. 4a shows the bit error rate in case there is no frequency offset, i.e., when the frequency offset is 0 KHz, FIG. 4b shows the bit error rate in case when the frequency offset is 50 KHz, FIG. 4c shows the bit error rate in case when the frequency offset is 150 KHz4e, and finally FIG. 4e shows the bit error rate when the frequency offset is at maximum (196 KHz). Examining FIGS. 4a to 4e, the bit error rates of the symbol detector with frequency offsets compensated according to the present invention are superior to the conventional symbol detector by about 1 dB at BER=$10^{-3}$. That is, the symbol detector with frequency offsets compensated according to the present invention eliminates square loss resulting from the squaring process in the conventional non-coherent method, thereby performing with improved capabilities.

According to certain embodiments of the present invention set forth above, frequency offsets are estimated using one symbol contained in a preamble in an OQPSK short-range wireless communication system to compensate for the frequency offsets, thereby easily detecting symbols. Also, according to the certain embodiments of the invention, degradation of capabilities resulting from the squaring process included in the conventional non-coherent method can be prevented, thereby obtaining improvement of capabilities by about 1 dB at BER=$10^{-3}$.

Further, with the squaring process in the conventional non-coherent symbol detector eliminated, the symbol detector according to the present invention can be easily realized as hardware.

While the present invention has been shown and described in connection with the preferred embodiments, it will be apparent to those skilled in the art that modifications and variations can be made without departing from the spirit and scope of the invention as defined by the appended claims.

What is claimed is:

1. A symbol detector based on frequency offset compensation in ZigBee system, wherein the symbol detector detects symbols of a signal which is expanded in its band by a PN sequence to be received in an Offset Quaternary Phase Shift Keying (OQPSK) short-range wireless communication system, comprising:

a frequency offset estimator for acquiring frequency offset in the received signal using a particular symbol contained in a preamble of a packet of the signal;

a multi-delay-differential filter for multi-delay-differentiating the signal by a plurality of predetermined delay times;

a multi-frequency offset compensator for complex-conjugating the multi-delay-differentiated signal by the multi-delay differential filter and the frequency offset acquired by the frequency offset estimator to eliminate the frequency offset;

a plurality of multi-correlators for correlating an output value from the multi-frequency offset compensator and a PN sequence delay-differentiated through the same process as conducted by the multi-delay-differential filter, where the PN sequence corresponds one-to-one to the particular symbol;

a plurality of summers for summing individual output values from the multi-correlators; and a maximum value selector for selecting a maximum value out of the summed values of the plurality of summers.

2. The symbol detector based on frequency offset compensation in ZigBee system according to claim 1, further comprising a symbol demapper for demapping a symbol corresponding to the maximum value selected by the maximum value selector into bit data.

3. The symbol detector based on frequency offset compensation in ZigBee system according to claim 1, wherein the frequency offset estimator comprises:

a multi-delay-differential filter for multi-delay-differentiating the received signal by a plurality of predetermined delay times;

means for complex-conjugating the particular symbol contained in the preamble of the packet of the multi-delay-differentiated received signal with a PN sequence multi-delay-differentiated in the same fashion as the multi-delay-differentiated signal, where the PN sequence corresponds to the particular symbol; and a mean calculator for acquiring a mean for the conjugated values of the particular symbol for one symbol period.

4. The symbol detector based on frequency offset compensation in ZigBee system according to claim 1, further comprising:

a plurality of delayers for delaying a received signal by a predetermined delay time;

first and second multipliers for multiplying the received signal by a signal delayed by each of the delayers, wherein the first multiplier multiplies a real value of the received signal by a real value of a 1Tc-delayed received signal and the second multiplier multiplies an imaginary value of the received signal by an imaginary value of the 1Tc-delayed received signal;

a third multiplier for multiplying a 1Tc-delayed signal of the real value of the received signal by the imaginary value of the received signal;

a fourth multiplier for multiplying the real value of the received signal by the imaginary value of the 1Tc-delayed received signal;

a first adder for adding output values of the first multiplier and the second multiplier to output a real value of the 1Tc-delayed received signal; and a second adder for subtracting an output value of the fourth multiplier from an output value of the third multiplier to output an imaginary value from the 1Tc-delayed received signal.

5. A symbol detecting method based on frequency offset compensation in ZigBee system, wherein symbols are detected from a signal which is expanded in its band by a PN sequence to be received in an OQPSK short-range wireless communication system, comprising steps of:

(i) acquiring frequency offset present in the signal using a particular symbol contained in a preamble of a packet of the signal;

(ii) multi-delay-differentiating the signal by a plurality of predetermined delay times;

(iii) complex-conjugating the multi-delay-differentiated received signal in the step (ii) with the frequency offset acquired in the step (i) to eliminate the frequency offset;

(iv) correlating an output value with the frequency eliminated in the step (iii) and a PN sequence multi-delay-differentiated through the same process as conducted by a multi-delay-differential filter, where the PN sequence corresponds to the particular symbol;

(v) summing individual output values correlated by multi-correlators; and (vi) selecting a maximum value out of the summed output values of the multi-correlators.

6. The symbol detecting method based on frequency offset compensation in ZigBee system according to claim 5, further comprising demapping a symbol corresponding to the maximum value selected in the step (vi) into bit data.

7. The symbol detecting method based on frequency offset compensation in ZigBee system according to claim 5, wherein the step (iii) includes steps of:

complex-conjugating the particular symbol contained in the preamble of the packet of the multi-delay-differentiated signal with the PN sequence multi-delay-differentiated in the same fashion as the multi-delay-differentiated signal, where the PN sequence corresponds to the particular symbol; and acquiring a mean for the conjugated values for one symbol period.

* * * * *